(12) United States Patent
Uchino et al.

(10) Patent No.: US 9,591,530 B2
(45) Date of Patent: Mar. 7, 2017

(54) MOBILE COMMUNICATION METHOD

(71) Applicant: NTT DOCOMO, INC., Tokyo (JP)

(72) Inventors: Tooru Uchino, Tokyo (JP); Hideaki Takahashi, Tokyo (JP); Akihito Hanaki, Tokyo (JP); Wuri Andarmawanti Hapsari, Tokyo (JP); Kenichiro Aoyagi, Tokyo (JP); Shogo Yabuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/415,748

(22) PCT Filed: Jul. 5, 2013

(86) PCT No.: PCT/JP2013/068473
§ 371 (c)(1),
(2) Date: Jan. 20, 2015

(87) PCT Pub. No.: WO2014/013892
PCT Pub. Date: Jan. 23, 2014

(65) Prior Publication Data
US 2015/0195748 A1    Jul. 9, 2015

(30) Foreign Application Priority Data

Jul. 20, 2012  (JP) ................................. 2012-161674

(51) Int. Cl.
*H04W 4/00*    (2009.01)
*H04W 36/00*   (2009.01)
*H04W 76/02*   (2009.01)

(52) U.S. Cl.
CPC ...... *H04W 36/0011* (2013.01); *H04W 76/028* (2013.01); *H04W 36/0072* (2013.01)

(58) Field of Classification Search
CPC .......... H04W 36/0011; H04W 76/028; H04W 36/0072
See application file for complete search history.

(56) References Cited

U.S. PATENT DOCUMENTS

| 2009/0086676 A1 | 4/2009 | Meylan et al. |
| 2015/0181461 A1* | 6/2015 | Kim ...................... H04W 74/08 370/236 |

FOREIGN PATENT DOCUMENTS

| JP | 2007-336490 A | 12/2007 |
| WO | 2011/017849 A1 | 2/2011 |

OTHER PUBLICATIONS

International Search Report for corresponding International Application No. PCT/JP2013/068473, mailed Jul. 30, 2013 (1 page).

(Continued)

*Primary Examiner* — Afshawn Towfighi
(74) *Attorney, Agent, or Firm* — Osha Liang LLP

(57) ABSTRACT

Even when handover processing to a radio base station T-eNB not supporting "extended PDCP-SN" is performed on a mobile station UE communicating with a radio base station S-eNB supporting "extended PDCP-SN," the communications are continued. A mobile communication method according to the invention includes the steps of: causing a radio base station S-eNB to determine to perform handover processing of a mobile station UE to a radio base station T-eNB not supporting "extended PDCP-SN" in a state where a first bearer using "extended PDCP-SN" is established with the mobile station UE, and causing the radio base station S-eNB to create "RRC connection reconfiguration" which instructs deletion of the first bearer and addition of a second bearer using "conventional PDCP-SN" and to transmit "RRC connection reconfiguration" to the mobile station UE.

1 Claim, 17 Drawing Sheets

(56) References Cited

OTHER PUBLICATIONS

Ericsson et al.; "Limitation of PDCP SN and FMS-fields;" 3GPP TSG-RAN WG2 #78, Tdoc R2-122651; Prague, Czech Republic; May 21-25, 2012 (6 pages).
3GPP TS 36.323 V10.1.0; "3rd Generation Partnership Project; Technical Specification Group Radio Access Network; Evolved Universal Terrestrial Radio Access (E-UTRA); Packet Data Convergence Protocol (PDCP) specification (Release 10);" Mar. 2011 (26 pages).
3GPP TS 36.322 V10.0.0; "3rd Generation Partnership Project; Technical Specification Group Radio Access Network; Evolved Universal Terrestrial Radio Access (E-UTRA); Radio Link Control (RLC) protocol specification (Release 10);" Dec. 2010 (39 pages).
Ericsson et al.; "Limitation of PDCP SN and FMS-fields;" 3GPP TSG-RAN WG2 #79, Tdoc R2-123875; QingDao, China; Aug. 13-17, 2012 (9 pages).
Samsung; "Discussion on PDCP SN extension;" 3GPP TSG-RAN WG2 Meeting #79, R2-124088; Qingdao, P.R.C.; Aug. 13-17, 2012 (4 pages).
Partial Supplementary European Search Report issued in corresponding European Application No. 13820074.6 dated Mar. 17, 2016 (13 pages).
Vice-Chairman (LG Electronics): Report of the LTE UP ad hoc meeting, 3GPP Draft; R2-124275 RAN2-79 Report of the LTE UP Ad Hoc Meeting Final, 3rd Generation Partnership Project (3GPP), Mobile Competence Centre; 650, Route Des Lucioles; F-06921 Sophia-Antipolis Cedex, vol. RAN WG2, No. Qingdao, China; Aug. 13, 2012-Aug. 17, 2012 Aug. 17, 2012 (Aug. 17, 2012), XP05066598 (12 pages).
Extended European Search Report issued Jul. 8, 2016, in corresponding European Patent Application No. 13820074.6 (27 pages).
3GPP TSG-RAN WG2 #68bis, R2-100294, "Delta signalling across eNBs of different RRC protocol release", Valencia, Spain, Jan. 18-22, 2010 (5 pages).

\* cited by examiner

FIG. 19
(a)
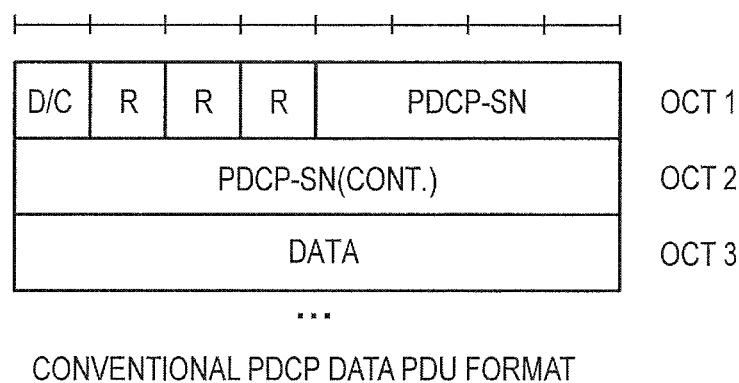
CONVENTIONAL PDCP DATA PDU FORMAT
(b)
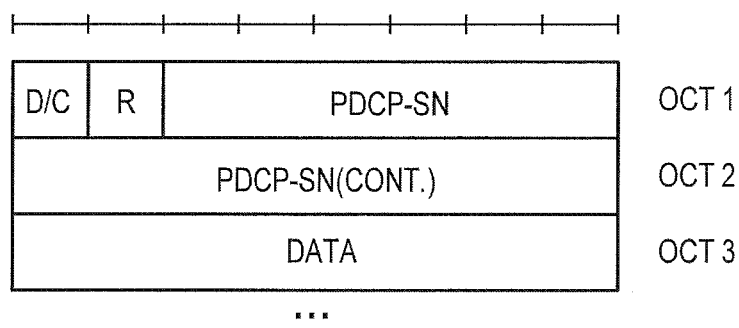
EXTENDED PDCP DATA PDU FORMAT

MOBILE COMMUNICATION METHOD

TECHNICAL FIELD

The present invention relates to a mobile communication method.

BACKGROUND ART

A radio based station supporting LTE (Long Term Evolution), and a mobile station UE have a PHY (physical) layer, a MAC (Media Access Control) layer, a RLC (Radio Link Control) layer, a PDCP (Packet Data Convergence Protocol) layer, and a RRC (Radio Resource Control) layer as illustrated in FIG. 12.

The PDCP layer is configured to perform ciphering processing, integrity protection/verification processing, and header compression processing.

Here, the ciphering processing and the integrity protection/verification processing use a COUNT value. As illustrated in FIG. 13, a COUNT value includes an HFN (Hyper Frame Number) and a PDCP-SN (Sequence Number).

The PDCP-SN includes 12 bits or 7 bits and is configured to be incremented every time the PDCP layer sends a packet to the RLC.

In addition, the HFN includes 20 bits or 25 bits and is configured to be increment every time the PDCP-SN goes once through all the numbers.

When COUNT values are not synchronized between a PDCP layer on a transmission side and a PDCP layer on a reception side, deciphering processing cannot be correctly performed in the PDCP layer on the reception side.

Specifically, the PDCP layer on the transmission side is configured to perform ciphering processing (header compression processing and integrity protection/verification processing) on a packet (PDCP-SDU) received from a RRC layer by using a COUNT value, and send the RLC layer the resultant received packet as PDCP-PDU with the PDCP-SN added to the header thereof.

On the other hand, the PDCP layer on the reception side is configured to manage a reception window and discard a received packet if the PDCP-SN added to the packet (PDCP-PDU) is PDCP-SN outside the reception window, as illustrated in FIG. 14.

Here, the PDCP layer on the reception side is configured to, if the PDCP-SN added to the received packet (PDCP-PDU) is PDCP-SN inside the reception window, estimate HFN to be used for deciphering the packet from a current reception state, send the packet (PDCP-SDU) deciphered using the estimated HFN to an upper layer, and update the reception window.

As illustrated in FIG. 15 and FIG. 16, when handover processing is completed, the PDCP layer on the transmission side starts transmitting all the packets whose acknowledgements have not been received in the RLC layer.

The PDCP layer on the reception side sends all the packets sendable to the upper layer even in an "out-of-sequence" state, and again tries to perform reception inside the reception window after the handover processing is completed.

Also, after the handover processing is completed, the PDCP layer on the reception side can report a reception status of "PDCP-SN" in "PDCP status report", whereas the PDCP layer on the transmission side can also cancel retransmission of packets reported as received.

As illustrated in FIG. 17 and FIG. 18, however, the following problem may occur. Specifically, a radio base station S-eNB transfers PDCP-SDU whose RLC-ACK is not received to a radio base station T-eNB. If a large amount of PDCP-PDUs are multiplexed on an RLC-PDU, for example, "HFN mismatch" may occur between the radio base station T-eNB and a mobile station UE, so that the reception side fails in the deciphering processing, and cannot extract packets in the normal state.

In particular, if a large amount of PDCP-PDUs are multiplexed on one RLC-PDU, a possibility of occurrence of "HFN mismatch" is high, due to transmission of a large number of PDCP-PDUs for which the RLC-ACK has not been received.

For example, the possibility of occurrence of "HFN mismatch" becomes high when a transmission rate is high, or when a large amount of packets whose size of PDCP-SDU is extremely small are generated.

For this reason, to avoid the occurrence of "HFN mismatch," proposed is to extend a PDCP-SN length, in other words, to adopt "extended PDCP-SN (see, FIG. 19(b))" which is a sequence number longer than "conventional PDCP-SN (see, FIG. 19(a))," (Non-patent document 3).

Use of "extended PDCP-SN" makes the PDCP-SN less likely to go once through all the numbers, and thus makes "HFN mismatch" less likely to occur.

Here, a radio base station eNB is configured to instruct the use of "extended PDCP-SN" to a mobile station UE through RRC signaling.

PRIOR ART DOCUMENT

Non-Patent Document

Non-patent document: 3GPP TS36.322
Non-patent document: 3GPP TS36.323
Non-patent document: 3GPP contributed article R2-122651

SUMMARY OF THE INVENTION

However, as illustrated in FIG. 20 and FIG. 21, when handover processing to a radio base station T-eNB not supporting "extended PDCP-SN" is performed on a mobile station UE communicating with a radio base station S-eNB supporting "extended PDCP-SN," there is a problem that communications cannot be continued because the mobile station UE and the radio base station T-eNB use the PDCP-SN with different lengths.

For this reason, the present invention is made with a view to the above-described problem. Accordingly, an objective of the invention is to provide a mobile communication method which enables communications to be continued even when handover processing to a radio base station T-eNB not supporting "extended PDCP-SN" is performed on a mobile station UE communicating with a radio base station S-eNB supporting "extended PDCP-SN."

A first feature of the present invention is summarized as a mobile communication method, including the steps of: in a state where a first radio base station establishes a first bearer with a mobile station by using an extended sequence number as a sequence number in a PDCP layer, causing the first radio base station to determine to perform handover processing of the mobile station to a second radio base station not supporting the extended sequence number; and causing the first radio base station to create a connection reconfiguration signal which instructs deletion of the first bearer and addition of a second bearer using a regular sequence number which is a sequence number shorter than the extended sequence number, and to transmit the connection reconfiguration signal to the mobile station.

A second feature of the present invention is summarized as a mobile communication method, including the steps of: in a state where a first radio base station establishes a first bearer with a mobile station by using an extended sequence number as a sequence number in a PDCP layer, causing the first radio base station to determine to perform handover processing of the mobile station to a second radio base station not supporting the extended sequence number; and causing the second ratio base station to create a handover instruction signal which instructs deletion of the first bearer and addition of a second bearer between the mobile station and the second radio base station, and to transmit the handover instruction signal to the first radio base station.

A third feature of the present invention is summarized as a mobile communication method, including the steps of: in a state where a first radio base station establishes a first bearer with a mobile station by using an extended sequence number as a sequence number in a PDCP layer, causing the first radio base station to determine to perform handover processing of the mobile station to a second radio base station not supporting the extended sequence number; and causing the first ratio base station to create a handover instruction signal which instructs deletion of the first bearer and addition of a second bearer with the second radio base station, and to transmit the handover instruction signal to the mobile station.

A fourth feature of the present invention is summarized as a mobile communication method, including the steps of: in a state where a first radio base station establishes a first bearer with a mobile station by using an extended sequence number as a sequence number in a PDCP layer, causing the first radio base station to determine to perform handover processing of the mobile station to a second radio base station not supporting the extended sequence number; and causing the second ratio base station to create a handover instruction signal which instructs deletion of all bearers and addition of a second bearer between the mobile station and the second radio base station, and to transmit the handover instruction signal to the first radio base station.

A fifth feature of the present invention is summarized as a mobile communication method, including the steps of: in a state where a first radio base station establishes a first bearer with a mobile station by using an extended sequence number as a sequence number in a PDCP layer, causing the first radio base station to determine to perform handover processing of the mobile station to a second radio base station not supporting the extended sequence number; and causing the first radio base station to create a connection reconfiguration signal which instructs reset of setting of the extended sequence number in the first bearer, and to transmit the connection reconfiguration signal to the mobile station.

A sixth feature of the present invention is summarized as a mobile communication method, including the steps of: in a state where a first radio base station establishes a first bearer with a mobile station by using an extended sequence number as a sequence number in a PDCP layer, causing the first radio base station to determine to perform handover processing of the mobile station to a second radio base station not supporting the extended sequence number; and causing the first ratio base station to create a handover instruction signal which instructs reset of setting of the extended sequence number in the first bearer and switch a connection destination of the first bearer to the second radio base station, and to transmit the handover instruction signal to the mobile station.

A seventh feature of the present invention is summarized as a mobile communication method, including the steps of: in a state where a first radio base station establishes a first bearer with a mobile station by using an extended sequence number as a sequence number in a PDCP layer, causing the first radio base station to determine to perform handover processing of the mobile station to a second radio base station not supporting the extended sequence number; and causing the mobile station to reset setting of the extended sequence number in the first bearer and to switch a connection destination of the first bearer to the second radio base station if a received handover instruction signal does not include an instruction to use the extended sequence number.

A eighth feature of the present invention is summarized as a mobile communication method, including the steps of: in a state where a first radio base station establishes a first bearer with a mobile station by using an extended sequence number as a sequence number in a PDCP layer, causing the first ratio base station to determine not to perform handover processing of the mobile station to a second radio base station if the first radio base station detects the second radio base station not supporting the extended sequence number; and causing the mobile station to perform reconnection processing with the second radio base station to establish a second bearer using a regular sequence number which is a sequence number shorter than the extended sequence number.

BRIEF DESCRIPTION OF THE DRAWINGS

FIG. 19 is a diagram for illustrating a conventional mobile communication system.

MODE FOR CARRYING OUT THE INVENTION

Mobile Communication System According to First Embodiment of the Invention

Referring to FIG. 1 to FIG. 11, a mobile communication system according to a first embodiment of the invention is described.

In the embodiment, an LTE mobile communication system in is described as an example, but the invention is not limited to such a mobile communication system but can be applied to a mobile communication system in any other scheme.

Figure 1:
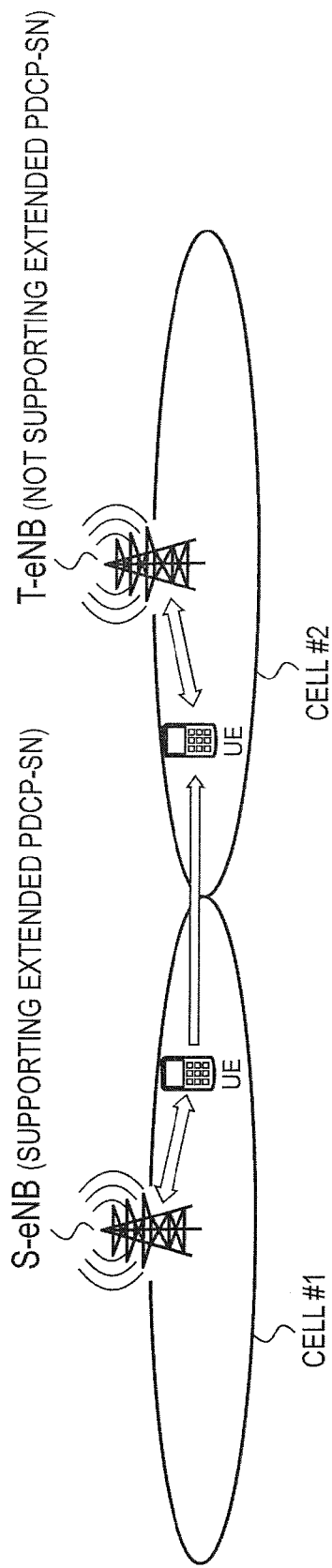
FIG. 1 is an overall configuration diagram of a mobile communication system according to a first embodiment of the invention.

As illustrated in FIG. 1, a mobile communication system according to the embodiment includes a radio base station S-eNB supporting "extended PDCP-SN" and a radio base station T-eNB not supporting "extended PDCP-SN," in other words, supporting only "conventional PDCP-SN."

Figure 2:
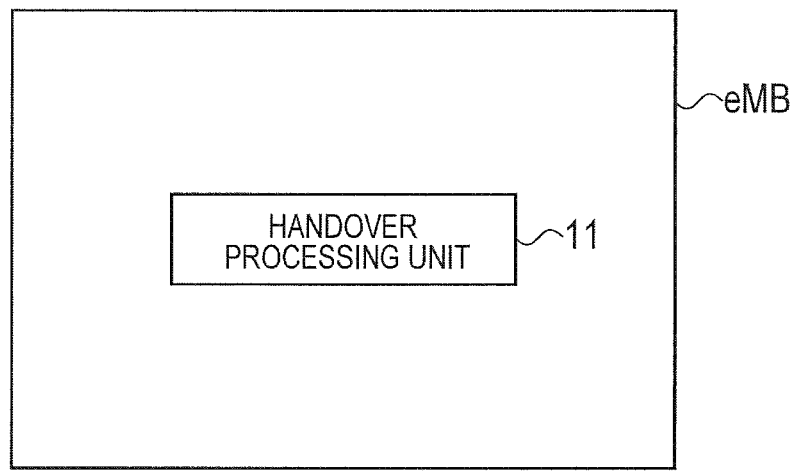
FIG. 2 is a functional block diagram of a radio base station according to the first embodiment of the invention.

As illustrated in FIG. 2, a radio base station eNB according to the embodiment includes a handover processing unit 11. The handover processing unit 11 is configured to perform processing needed for achieving handover processing of a mobile station UE (see, FIG. 4 to FIG. 11).

Figure 3:
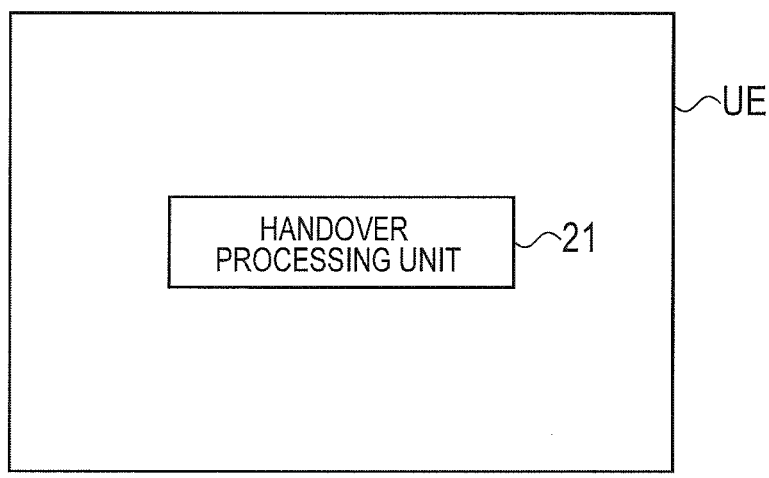
FIG. 3 is a functional block diagram of a mobile station according to the first embodiment of the invention.

As illustrated in FIG. 3, the mobile station UE according to the embodiment includes a handover processing unit 21. The handover processing unit 21 is configured to perform processing needed for achieving handover processing of the mobile station UE (see, FIG. 4 to FIG. 11).

Hereinafter, referring to FIG. 4 to FIG. 11, an example operation of the mobile communication system according to the embodiment is described.

Figure 4:
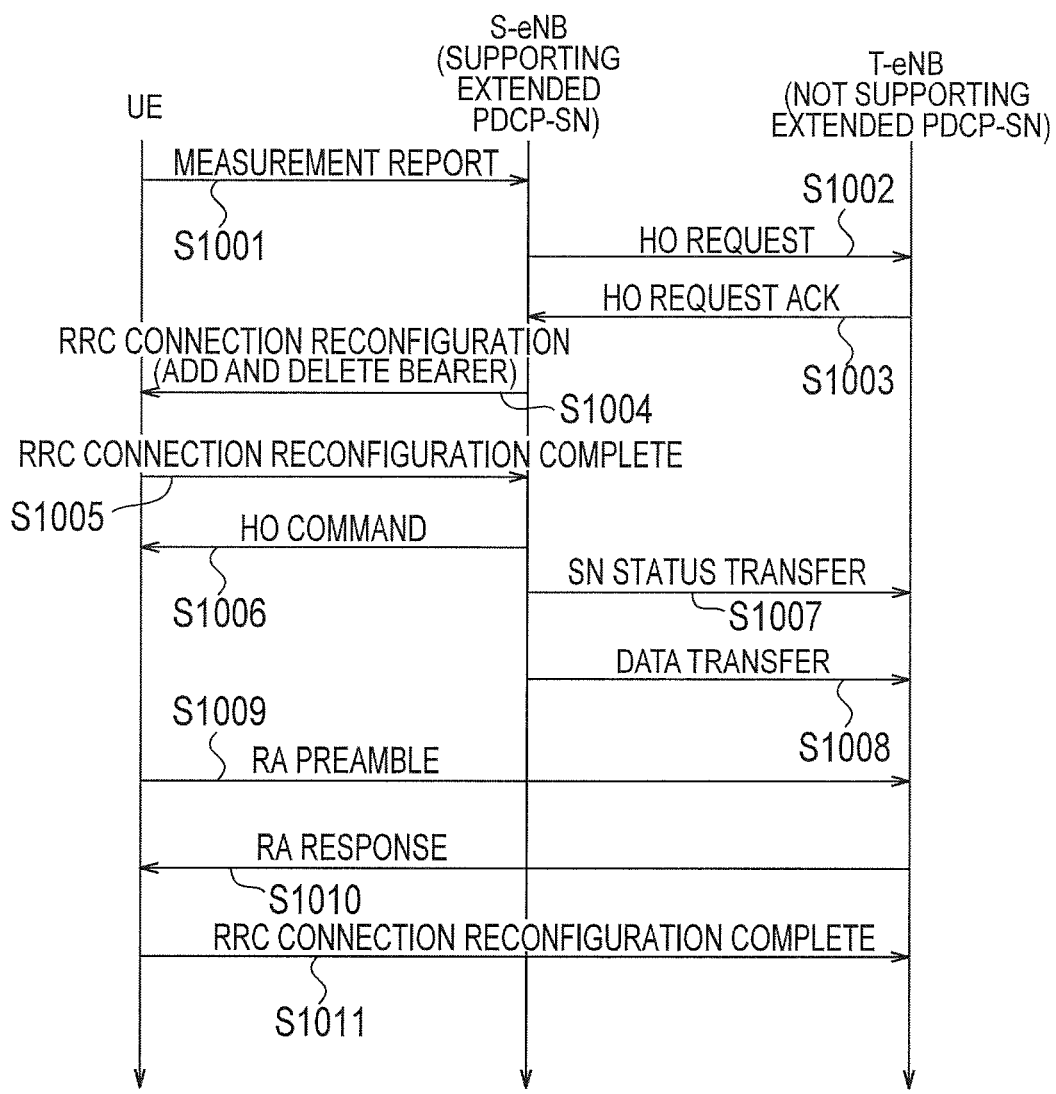
FIG. 4 is a sequence diagram showing an operation of a mobile communication system according to the first embodiment.

First, referring to FIG. 4, Example 1 of an operation of the mobile communication system according to the embodiment is described.

As illustrated in FIG. 4, at step S1001, a mobile station UE which establishes a first bearer using "extended PDCP-SN" with a radio base station S-eNB transmits "Measurement report" to the radio base station S-eNB.

Based on "Measurement report," the radio base station S-eNB determines to perform handover processing of the mobile station UE to the radio base station T-eNB.

Here, based on station information or the like, the radio base station S-eNB can know that the radio base station T-eNB does not support "extended PDCP-SN."

At step S1002, the radio base station S-eNB transmits "HO request" for instructing the handover processing to the radio base station T-eNB.

Here, to prevent the radio base station T-eNB from executing "Full configuration function," the radio base station S-eNB deletes an information element, among information elements in "HO request," which is incapable of being interpreted by the radio base station T-eNB.

Incidentally, when "Full configuration function" is executed, the radio base station T-eNB instructs the mobile station UE to delete and reset all the settings (including a bearer) other than C-RNTI (Cell-Ratio Network Temporary Identity).

At step S1003, the radio base station T-eNB transmits "HO request ack" to the radio base station S-eNB.

At step S1004, the radio base station S-eNB creates "RRC connection reconfiguration" which instructs deletion of the first bearer and addition of a second bearer using "conventional PDCP-SN" and transmits "RRC connection reconfiguration" to the mobile station UE.

At step S1005, the mobile station UE deletes the first bearer and establishes the second bearer using "conventional PDCP-SN" with the radio base station S-eNB, and transmits "RRC connection reconfiguration complete" to the radio base station S-eNB.

As a result, the radio base station S-eNB can temporarily delete the first bearer and establish the second bearer using "conventional PDCP-SN" with the mobile station UE.

Incidentally, operations at steps S1004 and S1005 may be performed before step S1002.

At step S1006, the radio base station S-eNB transmits "HO command" included in the received "HO request ack" to the mobile station UE.

The radio base station S-eNB transmits "SN status transfer" at step S1007 and performs data transfer at step S1008 to the radio base station T-eNB.

At step S1009, the mobile station UE transmits "RA preamble" to the radio base station T-eNB. At step S1010, the radio base station T-eNB transmits "RA response" to the mobile station UE. At step S1011, the mobile station UE transmits "RRC connection reconfiguration complete" to the radio base station T-eNB.

As a result, a connection destination of the second bearer is switched from the radio base station S-eNB to the radio base station T-eNB.

Figure 5:
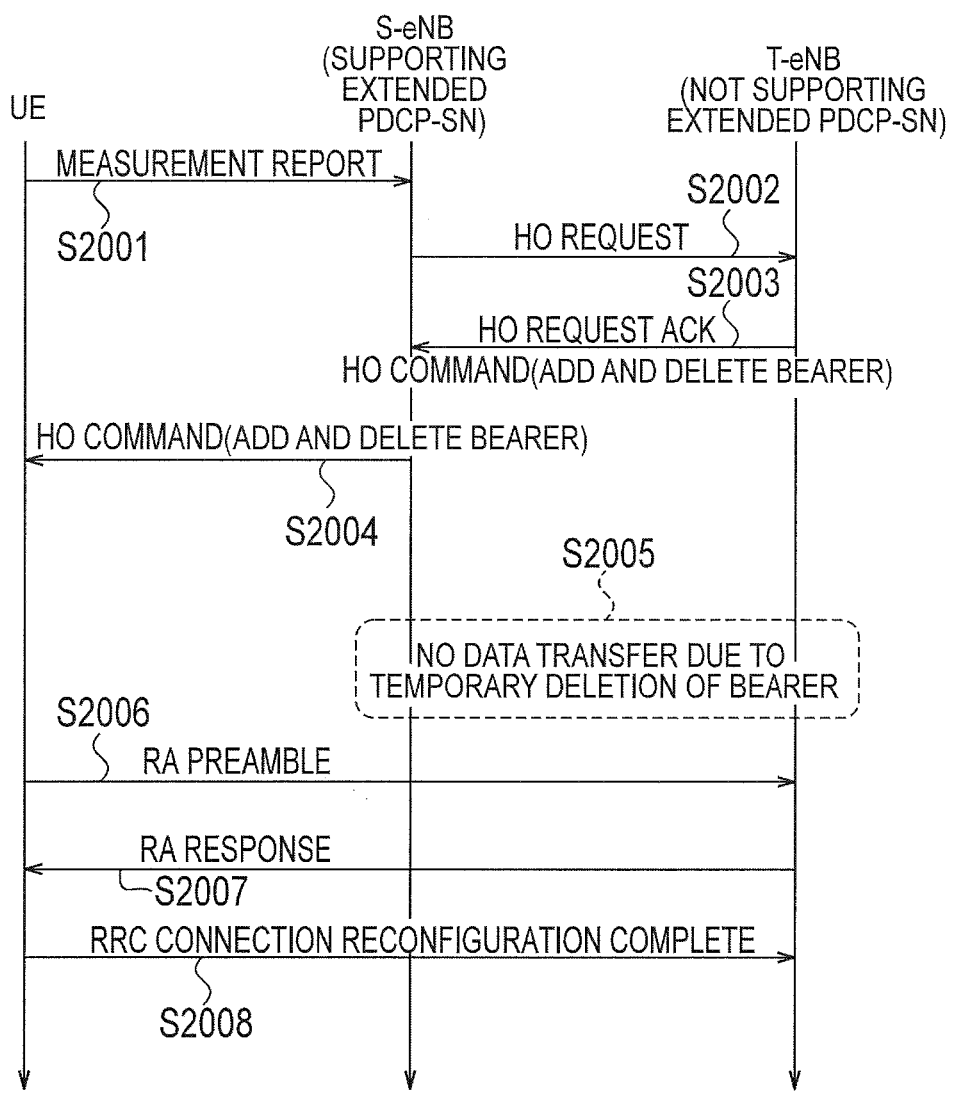
FIG. 5 is a sequence diagram showing an operation of the mobile communication system according to the first embodiment of the invention.

Second, referring to FIG. 5, Example 2 of an operation of the mobile communication system according to the embodiment is described.

As illustrated in FIG. 5, at step S2001, a mobile station UE which establishes a first bearer using "extended PDCP-SN" with a radio base station S-eNB transmits "Measurement report" to the radio base station S-eNB.

Based on "Measurement report," the radio base station S-eNB determines to perform handover processing of the mobile station UE to the radio base station T-eNB.

It is assumed here that the radio base station S-eNB can grasp based on station information or the like that the radio base station T-eNB does not support "extended PDCP-SN."

At step S2002, the radio base station S-eNB transmits "HO request" to instruct the handover processing to the radio base station T-eNB.

Here, to prevent the radio base station T-eNB from executing "Full configuration function," the radio base station S-eNB deletes an information element, among information elements in "HO request," which is incapable of being interpreted by the radio base station T-eNB.

Also, the radio base station S-eNB may request the radio base station T-eNB to delete the first bearer and add a second bearer between the mobile station UE and the radio base station T-eNB with an information element (newly defined) in the above-described "HO request."

At step S2003, based on "HO request," the radio base station T-eNB creates "HO command" which instructs deletion of the first bearer and addition of a second bearer between the mobile station UE and the radio base station T-eNB and transmits "HO request ack" including "HO command" to the radio base station S-eNB.

At step S2004, the radio base station S-eNB transmits "HO command" included in the received "HO request ack" to the mobile station UE.

Here, the mobile station UE deletes the first bearer according to "HO command."

Since the first bearer is deleted temporarily in such handover processing, the data transfer from the radio base station S-eNB to the radio base station T-eNB is not performed (step S2005).

At step S2006, the mobile station UE transmits "RA preamble" to the radio base station T-eNB. At step S2007, the radio base station T-eNB transmits "RA response" to the mobile station UE. At step S2008, the mobile station UE transmits "RRC connection reconfiguration complete" to the radio base station T-eNB.

As a result, the second bearer using "conventional PDCP-SN" is established between the mobile station UE and the radio base station T-eNB.

Figure 6:
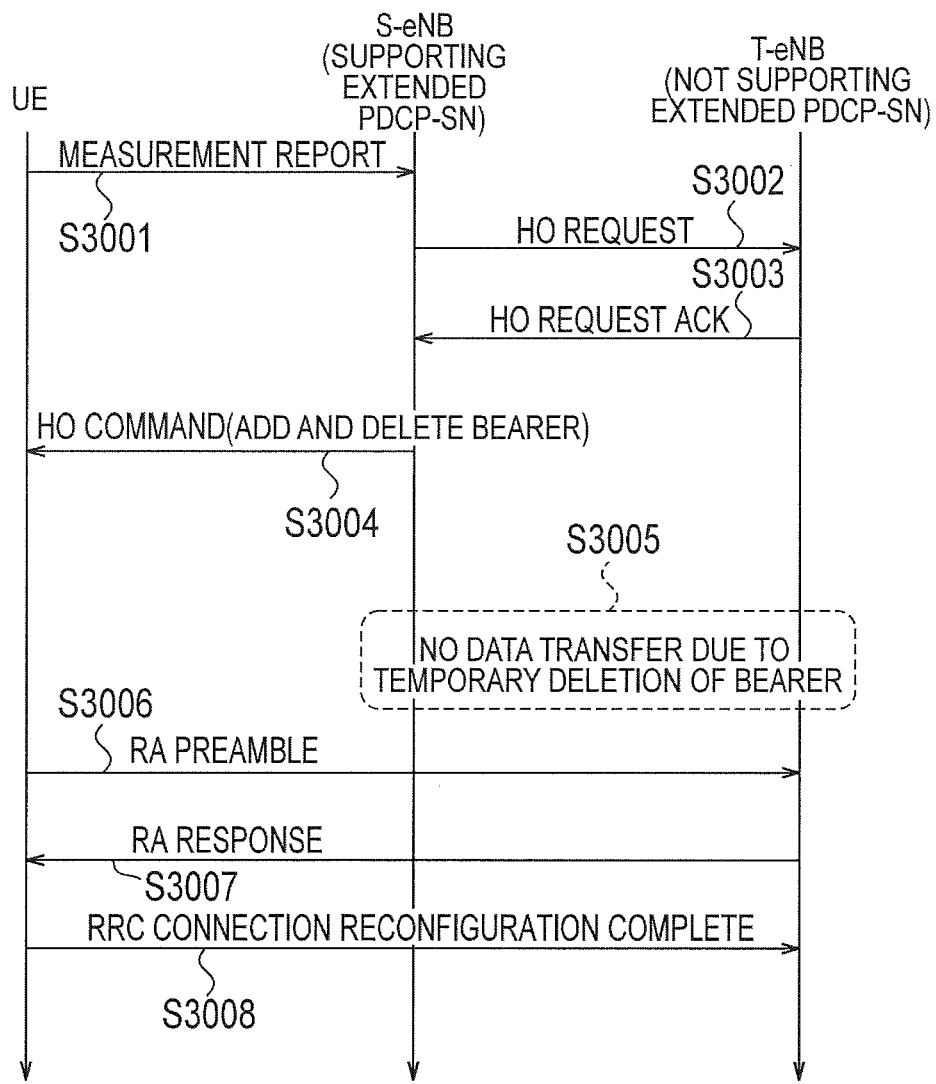
FIG. 6 is a sequence diagram showing an operation of the mobile communication system according to the first embodiment of the invention.

Third, referring to FIG. 6, Example 3 of an operation of the mobile communication system according to the embodiment is described.

As illustrated in FIG. 6, at step S3001, a mobile station UE which establishes a first bearer using "extended PDCP-SN" with a radio base station S-eNB transmits "Measurement report" to the radio base station S-eNB.

Based on "Measurement report," the radio base station S-eNB determines to preform handover processing of the mobile station UE to the radio base station T-eNB.

It is assumed here that the radio base station S-eNB can grasp based on station information or the like that the radio base station T-eNB does not support "extended PDCP-SN."

At step S3002, the radio base station S-eNB transmits "HO request" to instruct the handover processing to the radio base station T-eNB.

Here, to prevent the radio base station T-eNB from executing "Full configuration function," the radio base station S-eNB deletes an information element, among information elements in "HO request," which is incapable of being interpreted by the radio base station T-eNB.

Also, the radio base station S-eNB may request the radio base station T-eNB to delete the first bearer and add a second bearer between the mobile station UE and the radio base station T-eNB with an information element (newly defined) in the above-described "HO request."

At step S3003, based on "HO request," the radio base station T-eNB creates "HO command" and transmits "HO request ack" including "HO command" to the radio base station S-eNB.

At step S3004, the radio base station S-eNB transmits "HO command" included in the received "HO request ack" with the instruction to delete the first bearer and to add a second bearer between the mobile station and the radio base station T-eNB, to the mobile station UE.

Here, the mobile station UE deletes the first bearer according to "HO command."

Since the first bearer is DELETED TEMPORARILY in such handover processing, the data transfer from the radio base station S-eNB to the radio base station T-eNB is not performed (step S3005).

At step S3006, the mobile station UE transmits "RA preamble" to the radio base station T-eNB. At step S3007, the radio base station T-eNB transmits "RA response" to the mobile station UE. At step S3008, the mobile station UE transmits "RRC connection reconfiguration complete" to the radio base station T-eNB.

As a result, the second bearer using "conventional PDCP-SN" is established between the mobile station UE and the radio base station T-eNB.

Figure 7:
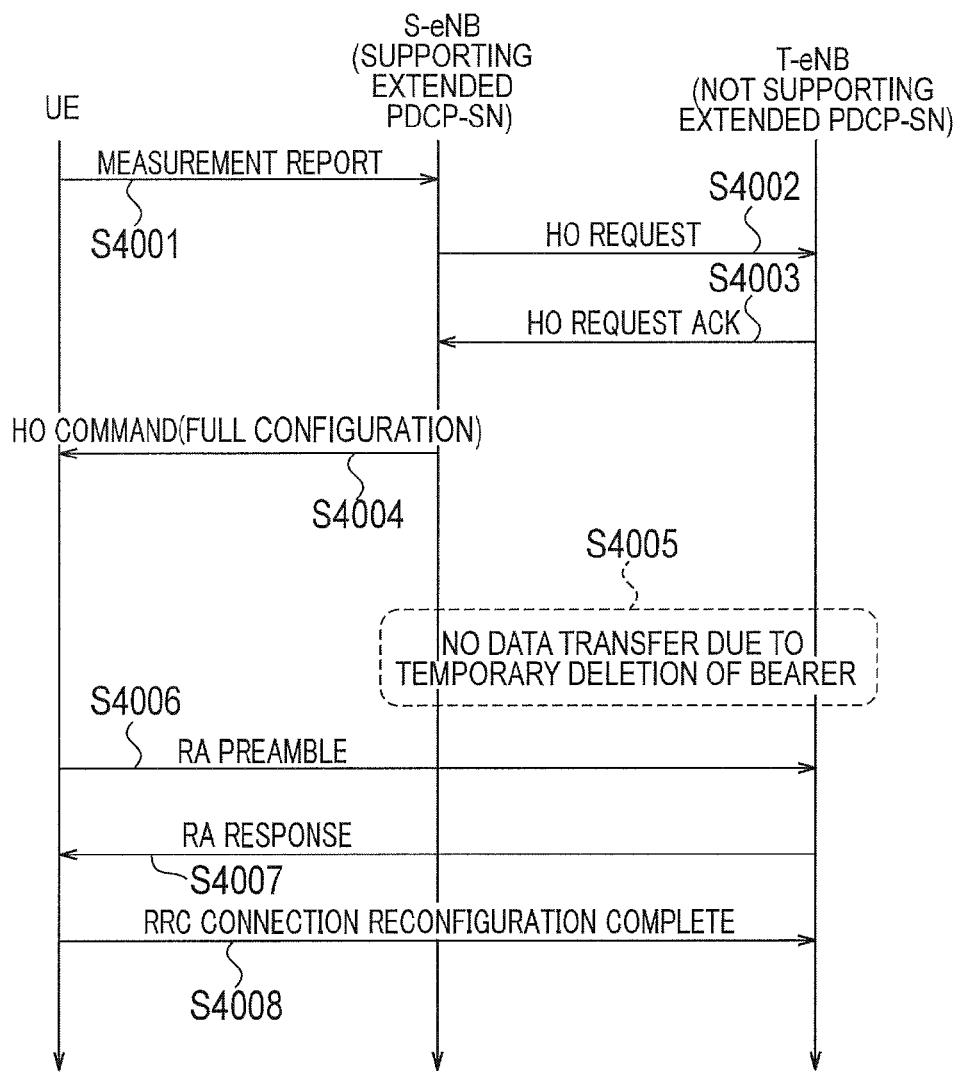
FIG. 7 is a sequence diagram showing an operation of the mobile communication system according to the first embodiment of the invention.

Fourth, referring to FIG. 7, Example 4 of an operation of the mobile communication system according to the embodiment is described.

As illustrated in FIG. 7, at step S4001, a mobile station UE which establishes a first bearer using "extended PDCP-SN" with a radio base station S-eNB transmits "Measurement report" to the radio base station S-eNB.

Based on "Measurement report," the radio base station S-eNB determines to perform handover processing of the mobile station UE to the radio base station T-eNB.

At step S4002, the radio base station S-eNB transmits "HO request" to instruct the handover processing to the radio base station T-eNB.

Here, it is assumed that even in a case where the radio base station S-eNB grasps based on station information or the like that the radio base station T-eNB does not support "extended PDCP-SN," such a measurement is not performed that an information element, among information elements in "HO request," which is incapable of being interpreted by the radio base station T-eNB is deleted so as to prevent the radio base station T-eNB to execute "Full configuration function."

In a case where at least one portion of the information element in "HO request" cannot be interpreted or where "extended PDCP-SN" is not supported, the radio base station T-eNB executes "Full configuration function."

As a result, at step S4003, the radio base station T-eNB creates "HO command (Full configuration)" which instructs deletion of all the first bearers and addition of a second bearer between the mobile station UE and the radio base station T-eNB and transmits "HO request ack" including "HO command (Full configuration)" to the radio base station S-eNB.

At step S4004, the radio base station S-eNB transmits "HO command (Full configuration)" included in the received "HO request ack" to the mobile station UE.

Here, the mobile station deletes all the bearers including the first bearer in response to "HO command (Full configuration)."

Since all the bearers are deleted temporarily in such handover processing, the data transfer from the radio base station S-eNB to the radio base station T-eNB is not performed (step S4005). Also, in such a case, a data loss is generated in all the bearers.

At step S4006, the mobile station UE transmits "RA preamble" to the radio base station T-eNB. At step S4007, the radio base station T-eNB transmits "RA response" to the mobile station UE. At step S4008, the mobile station UE transmits "RRC connection reconfiguration complete" to the radio base station T-eNB.

As a result, the second bearer using "conventional PDCP-SN" is established between the mobile station UE and the radio base station T-eNB.

Figure 8:
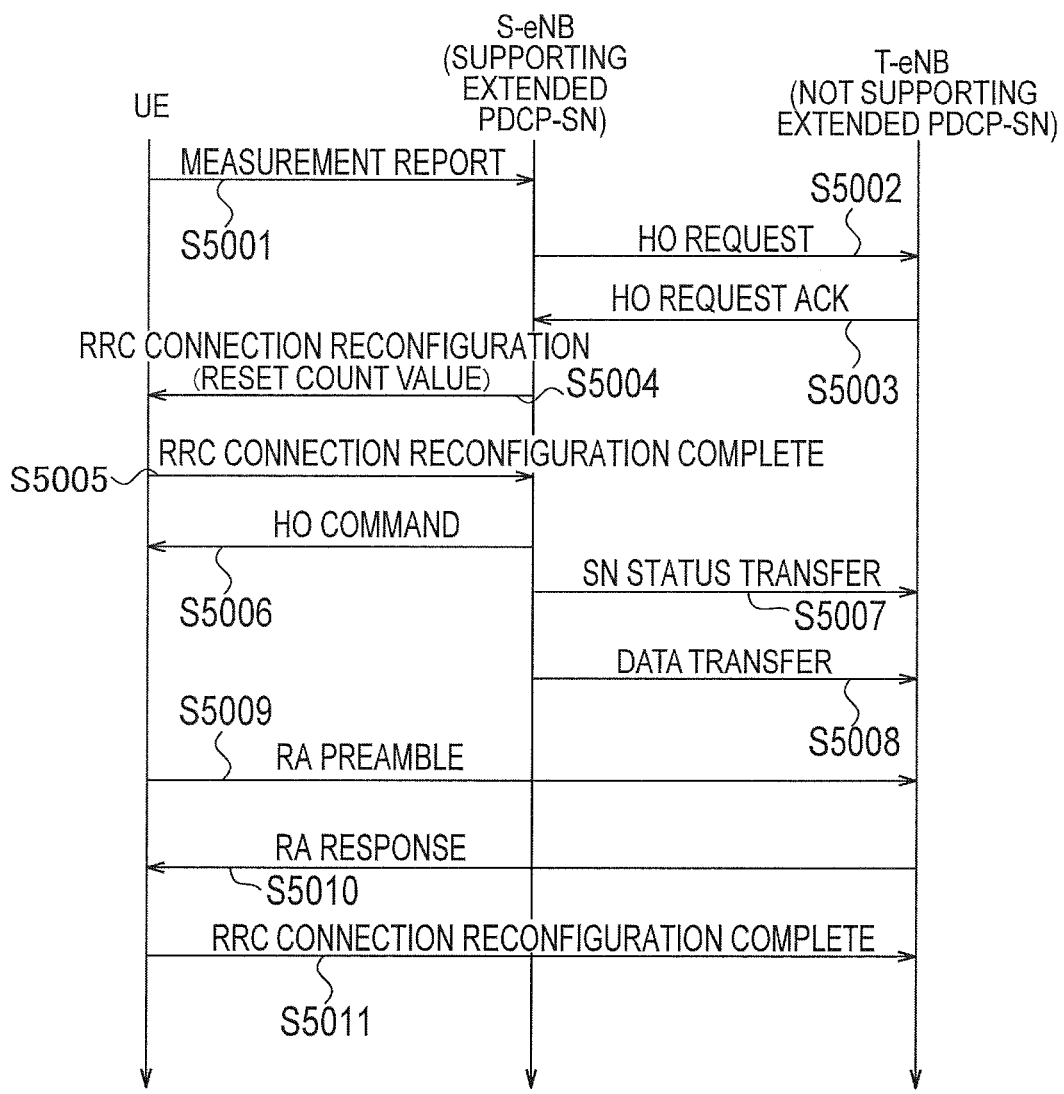
FIG. 8 is a sequence diagram showing an operation of the mobile communication system according to the first embodiment of the invention.

Fifth, referring to FIG. 8, Example 5 of an operation of the mobile communication system according to the embodiment is described.

As illustrated in FIG. 8, at step S5001, a mobile station UE which establishes a first bearer using "extended PDCP-SN" with a radio base station S-eNB transmits "Measurement report" to the radio base station S-eNB.

Based on "Measurement report," the radio base station S-eNB determines to perform handover processing of the mobile station UE to the radio base station T-eNB.

Here, based on station information or the like, the radio base station S-eNB can know that the radio base station T-eNB does not support "extended PDCP-SN."

At step S5002, the radio base station S-eNB transmits "HO request" to instruct the handover processing to the radio base station T-eNB.

Here, to prevent the radio base station T-eNB from executing "Full configuration function," the radio base station S-eNB deletes an information element, among information elements in "HO request," which is incapable of being interpreted by the radio base station T-eNB.

At step S5003, the radio base station T-eNB transmits "HO request ack" to the radio base station S-eNB.

At step S5004, the radio base station S-eNB creates and transmits "RRC connection reconfiguration" which instructs reset of setting of "extended PDCP-SN" (including a COUNT value) to the mobile station UE.

Here, the radio base station S-eNB temporarily resets the setting of "extended PDCP-SN" (including a COUNT value) in the first bearer.

At step S5005, the mobile station UE resets the setting of "extended PDCP-SN" (including a COUNT value) in the first bearer and transmits "RRC connection reconfiguration complete" to the radio base station S-eNB. Hereinafter, the first bearer uses "conventional PDCP-SN."

Incidentally, operations of steps S5004 and S5005 may be performed before step S5002.

At step S5006, the radio base station S-eNB transmits "HO command" included in the received "HO request ack" to the mobile station UE.

The radio base station S-eNB transmits "SN status transfer" to the radio base station T-eNB at step S5007 and performs data transfer at step S5008.

At step S5009, the mobile station UE transmits "RA preamble" to the radio base station T-eNB. At step S5010, the radio base station T-eNB transmits "RA response" to the mobile station UE. At step S5011, the mobile station UE transmits "RRC connection reconfiguration complete" to the radio base station T-eNB.

As a result, a connection destination of the first bearer is switched from the radio base station S-eNB to the radio base station T-eNB.

Figure 9:
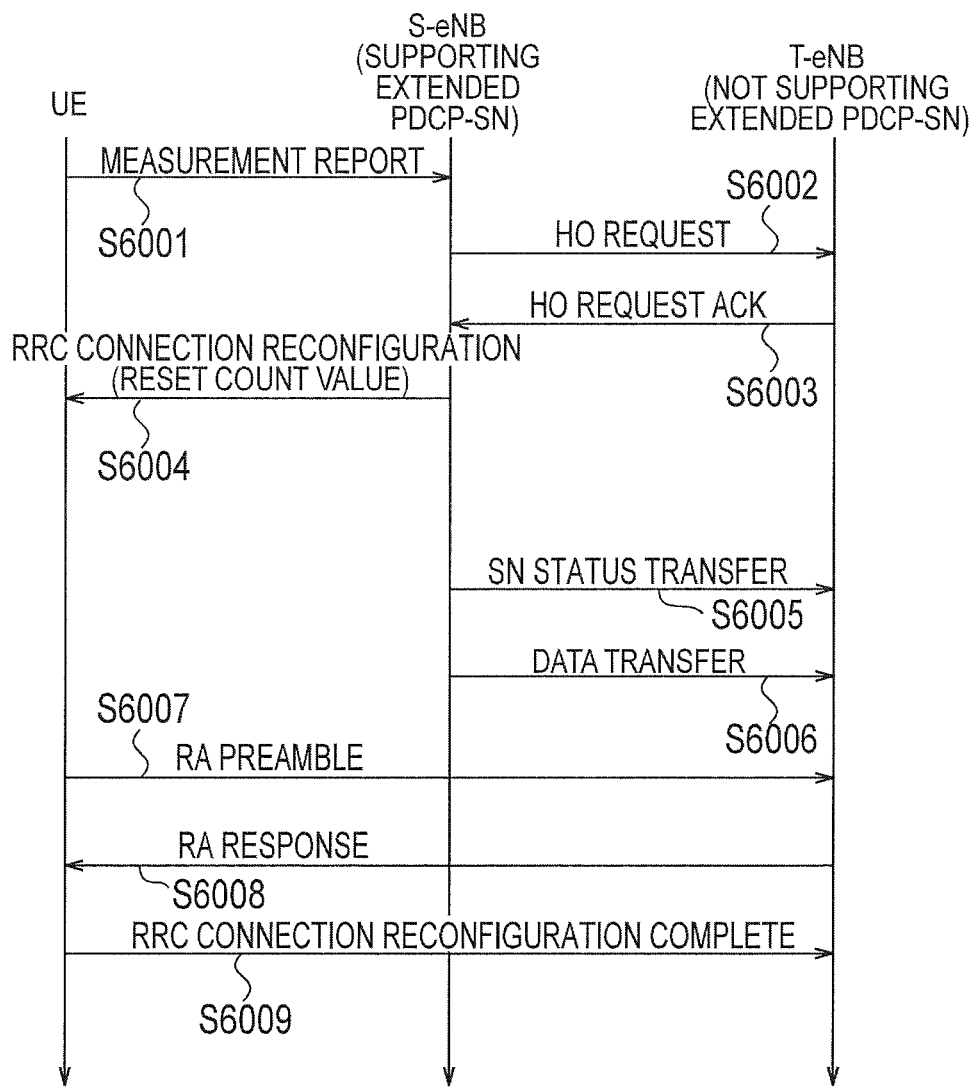
FIG. 9 is a sequence diagram showing an operation of the mobile communication system according to the first embodiment of the invention.

Sixth, referring to FIG. 9, Example 6 of an operation of the mobile communication system according to the embodiment is described.

As illustrated in FIG. 9, at step S6001, a mobile station UE which establishes a first bearer using "extended PDCP-SN" with a radio base station S-eNB transmits "Measurement report" to the radio base station S-eNB.

Based on "Measurement report," the radio base station S-eNB determines to perform handover processing of the mobile station UE to the radio base station T-eNB.

It is assumed here that the radio base station S-eNB can grasp based on station information or the like that the radio base station T-eNB does not support "extended PDCP-SN."

At step S6002, the radio base station S-eNB transmits "HO request" to instruct the handover processing to the radio base station T-eNB.

Here, to prevent the radio base station T-eNB from executing "Full configuration function," the radio base station S-eNB deletes an information element, among information elements in "HO request," which is incapable of being interpreted by the radio base station T-eNB.

At step S6003, the radio base station T-eNB transmits "HO request ack" to the radio base station S-eNB.

At step S6004, the radio base station S-eNB creates "HO command" which instructs reset of "extended PDCP-SN" (including a COUNT value) in the first bearer and switching of a connection destination of the first bearer to the radio base station T-eNB, and transmits "HO command" to the mobile station UE.

Here, the mobile station UE resets the setting of "extended PDCP-SN" (including a COUNT value) in the first bearer. Hereinafter, the first bearer uses "conventional PDCP-SN."

The radio base station S-eNB transmits "SN status transfer" to the radio base station T-eNB at step S6005 and performs data transfer at step S6006.

At step S6007, the mobile station UE transmits "RA preamble" to the radio base station T-eNB. At step S6008, the radio base station T-eNB transmits "RA response" to the mobile station UE. At step S6009, the mobile station UE transmits "RRC connection reconfiguration complete" to the radio base station T-eNB.

As a result, the connection destination of the first bearer is switched from the radio base station S-eNB to the radio base station T-eNB.

Seventh, Example 7 of an operation of the mobile communication system according to the embodiment is described.

Figure 10:
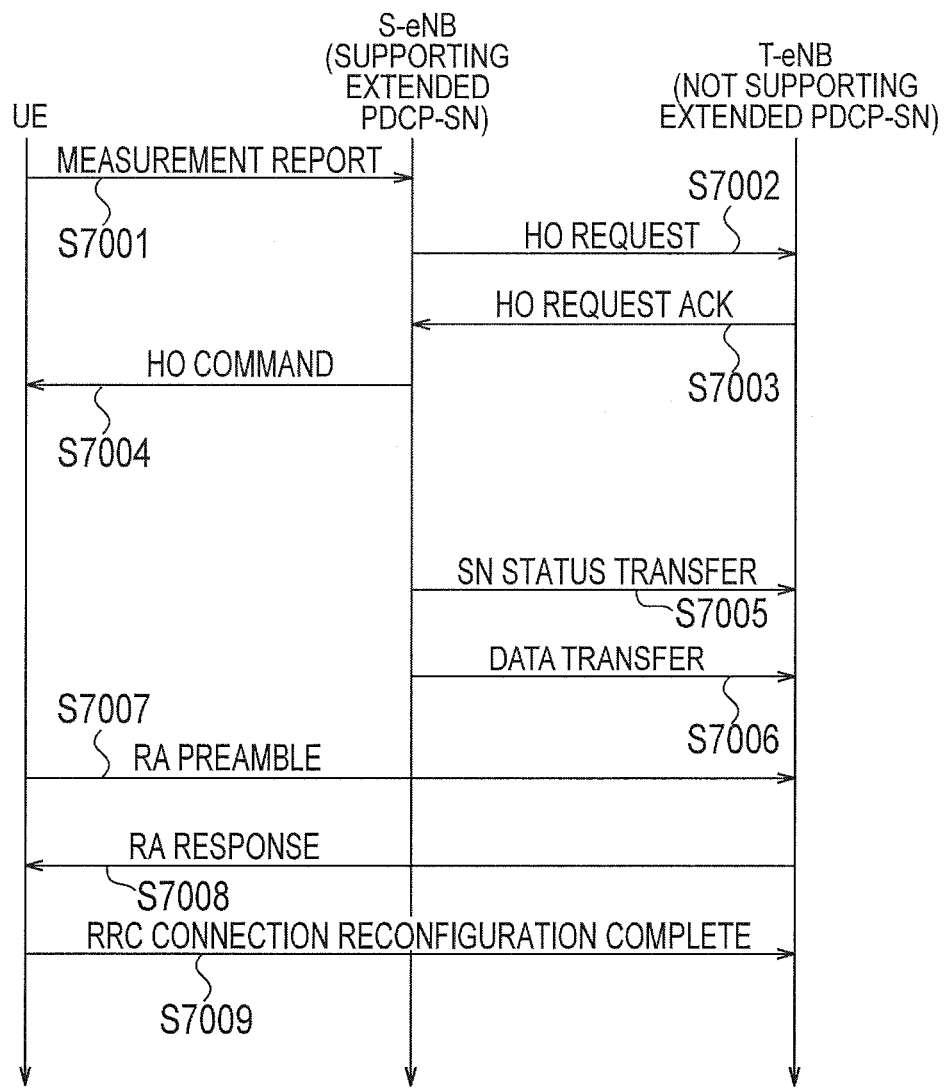
FIG. 10 is a sequence diagram showing an operation of the mobile communication system according to the first embodiment of the invention.

As illustrated in FIG. 10, at step S7001, a mobile station UE which establishes a first bearer using "extended PDCP-SN" with a radio base station S-eNB transmits "Measurement report" to the radio base station S-eNB.

Based on "Measurement report," the radio base station S-eNB determines to perform handover processing of the mobile station UE to the radio base station T-eNB.

It is assumed here that the radio base station S-eNB can grasp based on station information or the like that the radio base station T-eNB does not support "extended PDCP-SN."

At step S7002, the radio base station S-eNB transmits "HO request" which instructs the handover processing to the radio base station T-eNB.

Here, to prevent the radio base station T-eNB from executing "Full configuration function," the radio base station S-eNB deletes an information element, among information elements in "HO request," which is incapable of being interpreted by the radio base station T-eNB.

At step S7003, the radio base station T-eNB transmits "HO request ack" including "HO command" which instructs switching of the connection destination of the first bearer to the radio base station T-eNB to the radio base station S-eNB.

At step 7004, the radio base station S-eNB creates and transmits "HO command" which instructs switching of the connection destination of the first bearer to the radio base station T-eNB to the mobile station UE.

Here, the radio base station S-eNB resets the setting of "extended PDCP-SN" (including a COUNT value).

When the received "HO command" does not include the instruction to use "extended PDCP-SN," the mobile station UE resets the setting of "extended PDCP-SN" (including a COUNT value) in the first bearer. Hereinafter, the first bearer uses "conventional PDCP-SN."

The radio base station S-eNB transmits "SN status transfer" to the radio base station T-eNB at step S7005 and performs the data transfer at step S7006.

At step S7007, the mobile station UE transmits "RA preamble" to the radio base station T-eNB. At step S7008, the radio base station T-eNB transmits "RA response" to the mobile station UE. At step S7009, the mobile station UE transmits "RRC connection reconfiguration complete" to the radio base station T-eNB.

As a result, the connection destination of the first bearer is switched from the radio base station S-eNB to the radio base station T-eNB.

Figure 11:
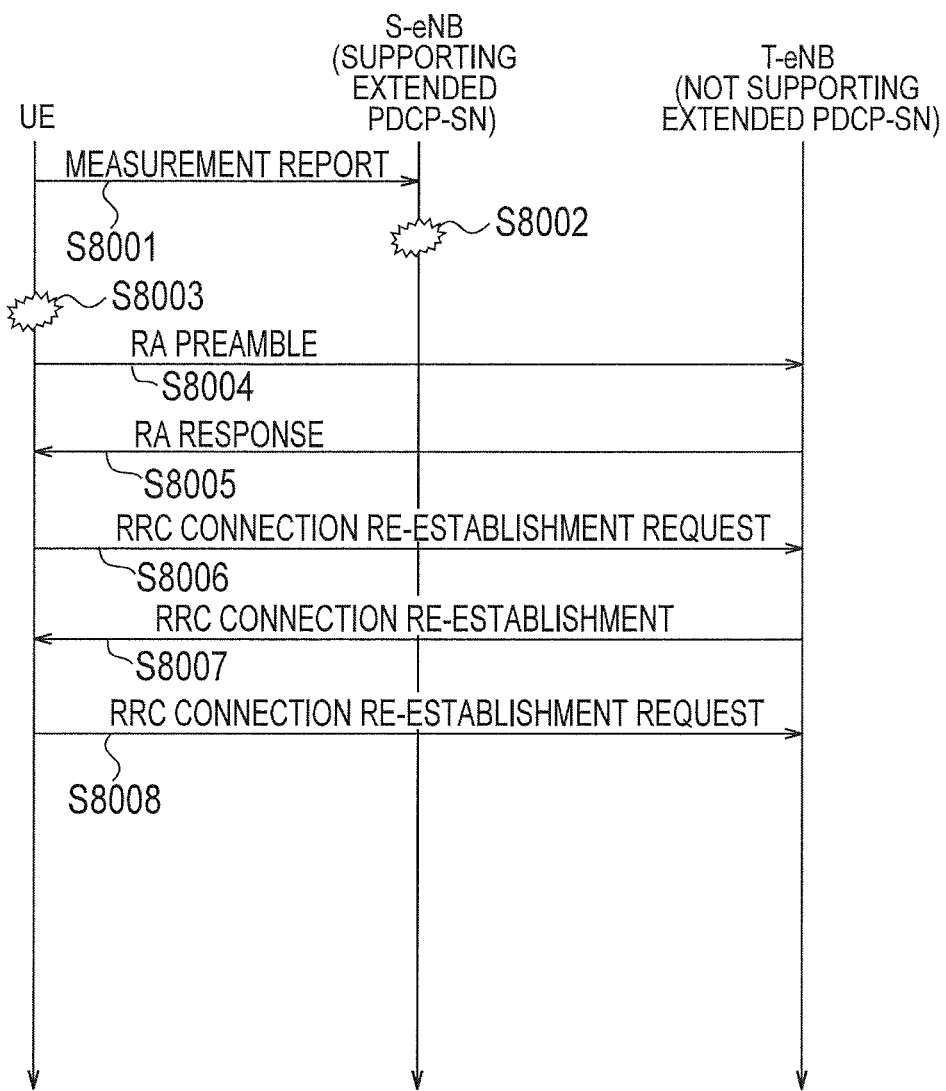
FIG. 11 is a sequence diagram showing an operation of the mobile communication system according to the first embodiment of the invention.
Figure 12:
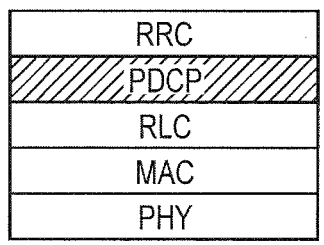
FIG. 12 is a diagram for illustrating a conventional mobile communication system.
Figure 13:
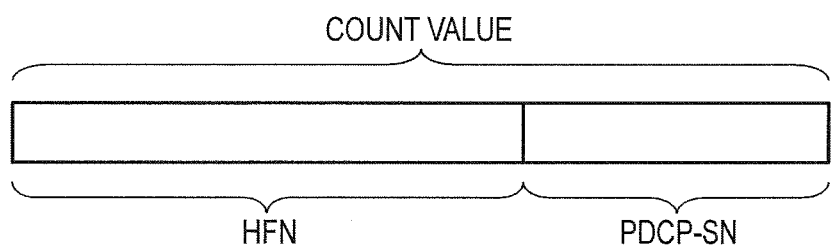
FIG. 13 is a diagram for illustrating a conventional mobile communication system.
Figure 14:
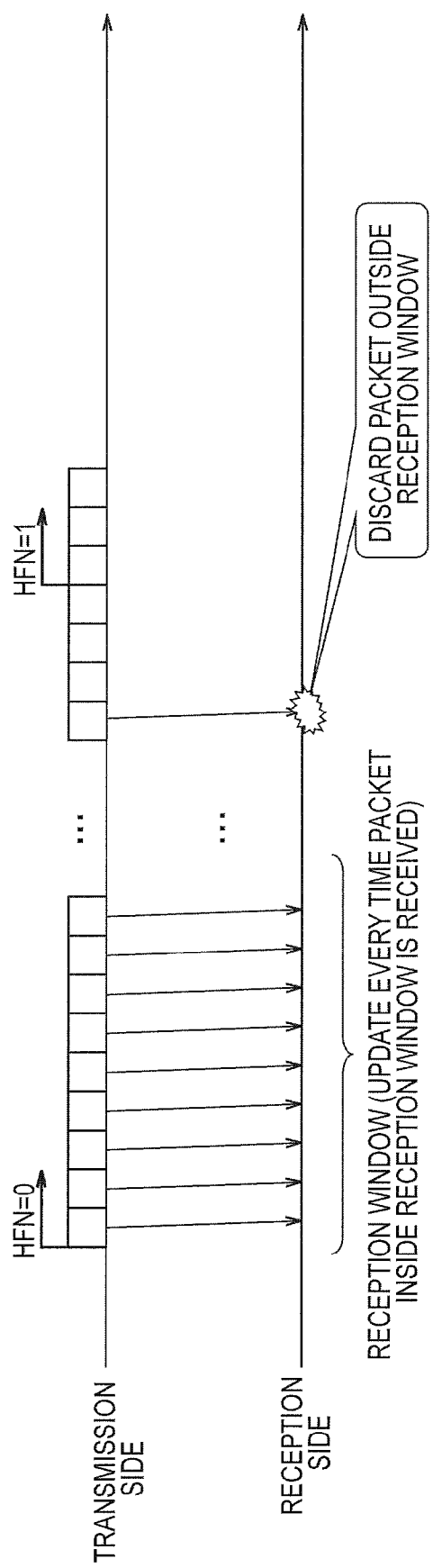
FIG. 14 is a diagram for illustrating a conventional mobile communication system.
Figure 15:
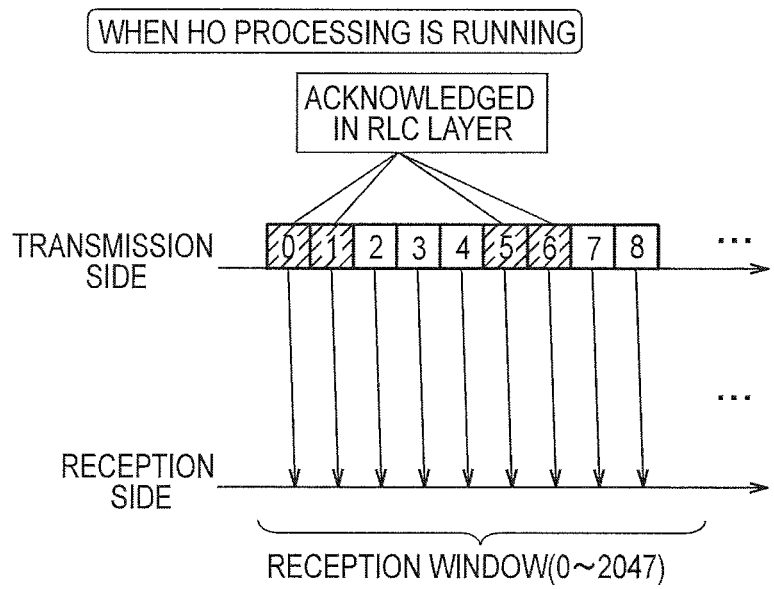
FIG. 15 is a diagram for illustrating a conventional mobile communication system.
Figure 16:
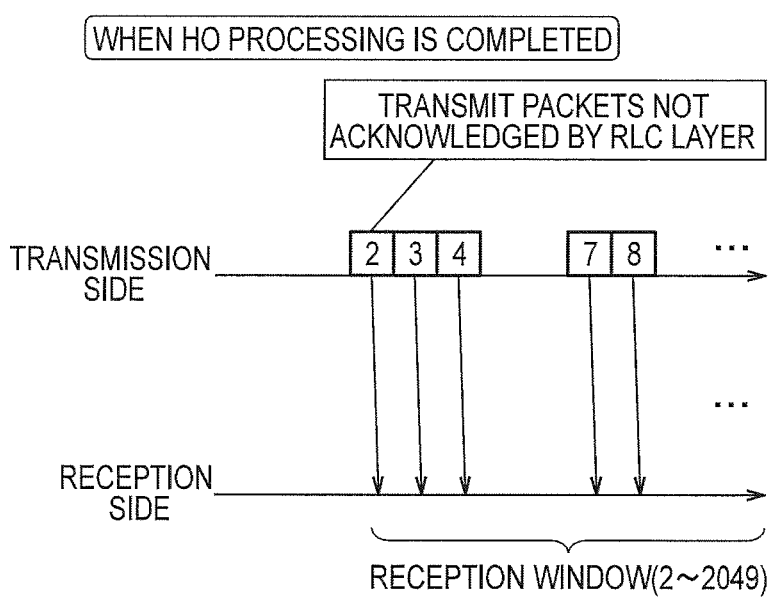
FIG. 16 is a diagram for illustrating a conventional mobile communication system.
Figure 17:
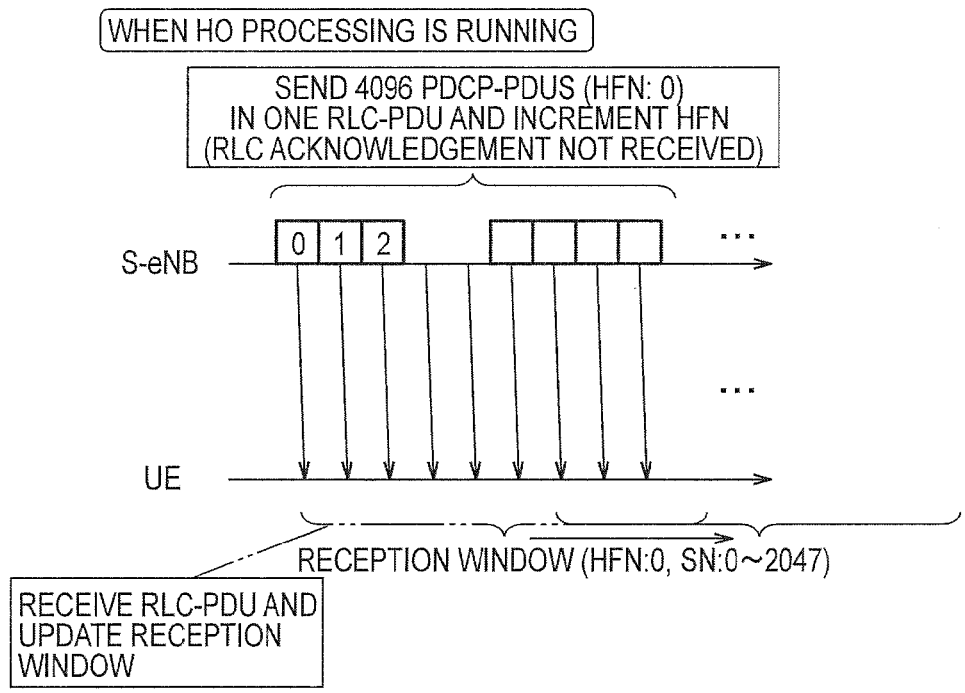
FIG. 17 is a diagram for illustrating a conventional mobile communication system.
Figure 18:
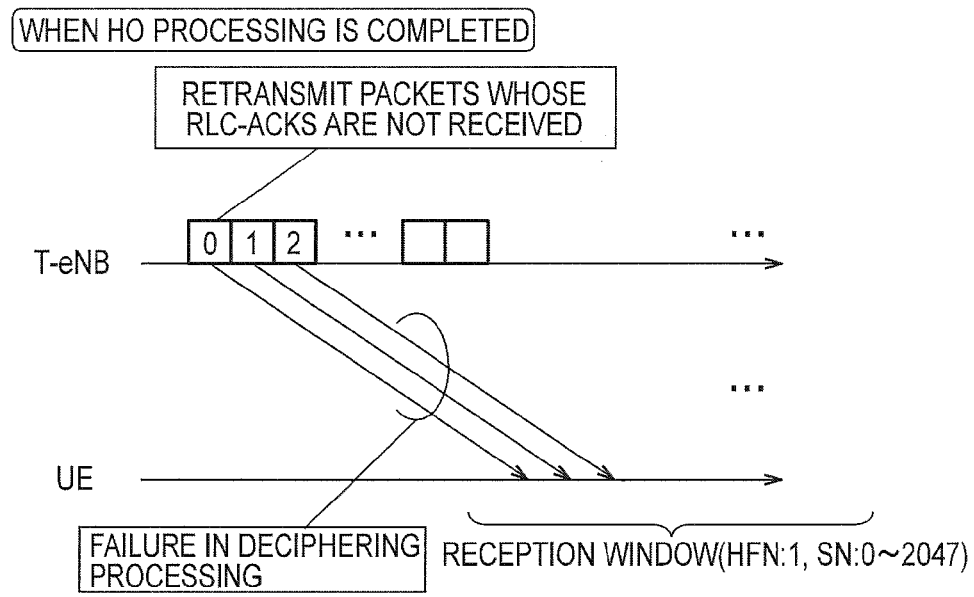
FIG. 18 is a diagram for illustrating a conventional mobile communication system.
Figure 20:
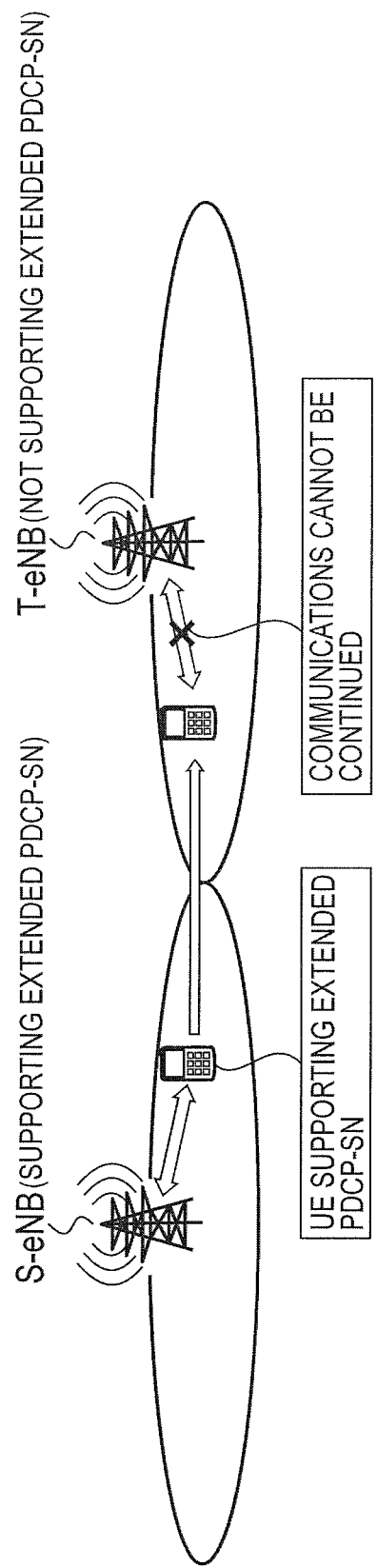
FIG. 20 is a diagram for illustrating a conventional mobile communication system.
Figure 21:
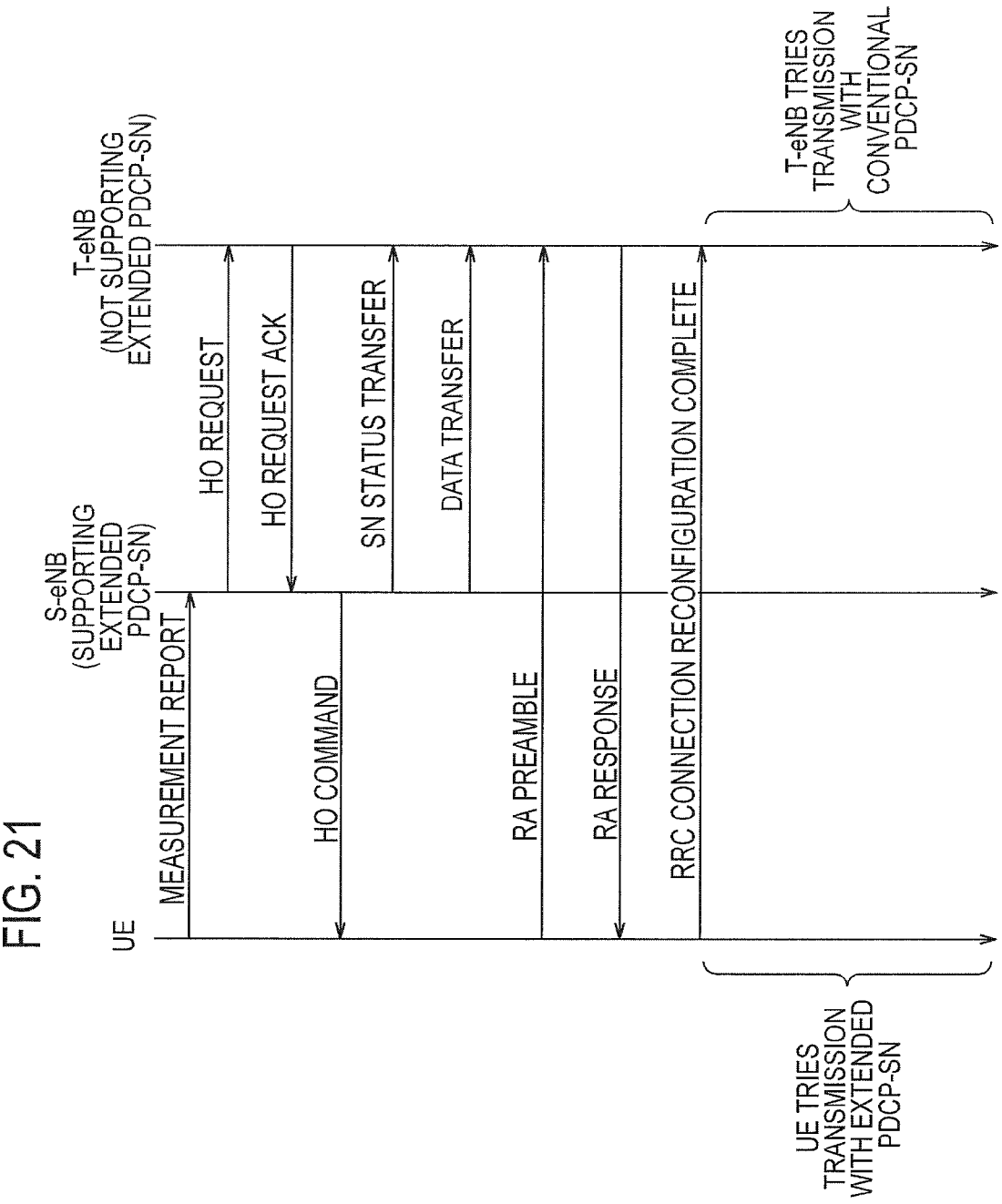
FIG. 21 is a diagram for illustrating a conventional mobile communication system.

Eighth, referring to FIG. 11, Example 8 of an operation of the mobile communication system according to the embodiment is described.

As illustrated in FIG. 11, at step S8001, a mobile station UE which establishes a first bearer using "extended PDCP-SN" with a radio base station S-eNB transmits "Measurement report" to the radio base station S-eNB.

At step S8002, in a case where the radio base station T-eNB is selected as a handover target candidate based on "Measurement report," the radio base station S-eNB determines not to perform handover processing of the mobile station UE to the radio base station T-eNB if detecting the radio base station T-eNB not supporting "extended PDCP-SN" based on station information or the like.

Here, the radio base station S-eNB discards "Measurement report."

At step S8003, the mobile station UE transitions to a cell #2 under the control of the radio base station T-eNB.

At step S8004, the mobile station UE transmits "RA preamble" to the radio base station T-eNB. At step S8005, the radio base station T-eNB "RA response" to the mobile station UE.

At step S8006, the mobile station UE transmits "RRC connection re-establishment request" to the radio base station T-eNB. At step S8007, the radio base station T-eNB transmits "RRC connection re-establishment" to the mobile station UE. At step S8008, the mobile station UE transmits "RRC connection re-establishment complete" to the radio base station T-eNB.

As described above, the mobile station UE performs reconnection processing with the mobile station UE, so that a second bearer using "conventional PDCP-SN" can be established.

In the mobile communication system according to the embodiment, the operations illustrated in FIG. 4 to FIG. 11 enable communications to be continued even when handover processing to the radio base station T-eNB not supporting "extended PDCP-SN" is performed on the mobile station UE communicating with the radio base station S-eNB supporting "extended PDCP-SN."

The features of the above-described embodiment may also be expressed as follows.

A first feature of this embodiment is summarized as a mobile communication method, including the steps of: in a state where a radio base station S-eNB (first radio base station) establishes a first bearer with a mobile station UE by using "extended PDCP-SN (extended sequence number)" as a sequence number in a PDCP layer, causing the radio base station S-eNB to determine to perform handover processing of the mobile station UE to a radio base station T-eNB (second radio base station) not supporting the "extended PDCP-SN"; and causing the radio base station S-eNB to create "RRC connection reconfiguration (connection reconfiguration signal)" which instructs deletion of the first bearer and addition of a second bearer using "conventional PDCP-SN," and to transmit the "RRC connection reconfiguration" to the mobile station UE.

A second feature of this embodiment is summarized as a mobile communication method, including the steps of: in a state where a radio base station S-eNB establishes a first bearer with a mobile station UE by using "extended PDCP-SN," causing the radio base station S-eNB to determine to perform handover processing of the mobile station UE to a radio base station T-eNB not supporting the "extended PDCP-SN"; and causing the ratio base station T-eNB to create "HO command (handover instruction signal)" which instructs deletion of the first bearer and addition of a second bearer between the mobile station UE and the radio base station T-eNB, and to transmit the "HO command" to the radio base station S-eNB.

A third feature of this embodiment is summarized as a mobile communication method, including the steps of: in a state where a radio base station S-eNB establishes a first bearer with a mobile station UE by using "extended PDCP-SN," causing the radio base station S-eNB to determine to perform handover processing of the mobile station UE to a radio base station T-eNB not supporting the "extended PDCP-SN"; and causing the ratio base station S-eNB to create "HO command" which instructs deletion of the first bearer and addition of a second bearer with the radio base station T-eNB, and to transmit the "HO command" to the mobile station UE.

A fourth feature of this embodiment is summarized as a mobile communication method, including the steps of: in a state where a radio base station S-eNB establishes a first bearer with a mobile station UE by using "extended PDCP-SN," causing the radio base station S-eNB to determine to perform handover processing of the mobile station UE to a radio base station T-eNB not supporting the "extended PDCP-SN"; and causing the second ratio base station to create a handover instruction signal which instructs deletion of all bearers and addition of a second bearer between the mobile station UE and the radio base station T-eNB, and to transmit the handover instruction signal to the radio base station S-eNB.

A fifth feature of this embodiment is summarized as a mobile communication method, including the steps of: in a state where a radio base station S-eNB establishes a first bearer with a mobile station UE by using "extended PDCP-SN," causing the radio base station S-eNB to determine to perform handover processing of the mobile station UE to a radio base station T-eNB not supporting the "extended PDCP-SN"; and causing the radio base station S-eNB to create a connection reconfiguration signal which instructs reset of setting of the "extended PDCP-SN" in the first bearer, and to transmit the connection reconfiguration signal to the mobile station UE.

A sixth feature of this embodiment is summarized as a mobile communication method, including the steps of: in a state where a radio base station S-eNB establishes a first bearer with a mobile station UE by using "extended PDCP-SN," causing the radio base station S-eNB to determine to perform handover processing of the mobile station UE to a radio base station T-eNB not supporting the "extended PDCP-SN"; and causing the first ratio base station to create a handover instruction signal which instructs reset of setting of the "extended PDCP-SN" in the first bearer and switch a connection destination of the first bearer to the s radio base station T-eNB, and to transmit the handover instruction signal to the mobile station UE.

A seventh feature of this embodiment is summarized as a mobile communication method, including the steps of: in a state where a radio base station S-eNB establishes a first bearer with a mobile station UE by using "extended PDCP-SN," causing the radio base station S-eNB to determine to perform handover processing of the mobile station UE to a radio base station T-eNB not supporting the "extended PDCP-SN"; and causing the mobile station UE to reset setting of the "extended PDCP-SN" in the first bearer and to switch a connection destination of the first bearer to the radio base station T-eNB if a received handover instruction signal does not include an instruction to use the "extended PDCP-SN".

An eighth feature of this embodiment is summarized as a mobile communication method, including the steps of: in a state where a radio base station S-eNB establishes a first bearer with a mobile station UE by using "extended PDCP-SN," causing the first ratio base station to determine not to perform handover processing of the mobile station UE to a radio base station T-eNB if the radio base station S-eNB detects the radio base station T-eNB not supporting the "extended PDCP-SN"; and causing the mobile station UE to perform reconnection processing with the radio base station T-eNB to establish a second bearer using a regular sequence number which is a sequence number shorter than the "extended PDCP-SN."

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-161674 (filed on Jul. 20, 2012) is incorporated by reference in the present specification.

INDUSTRIAL APPLICABILITY

As described above, the invention can provide a mobile communication method which enables communications to be continued even when handover processing to a radio base station T-eNB not supporting "extended PDCP-SN" is performed on a mobile station UE communicating with a radio base station S-eNB supporting "extended PDCP-SN."

EXPLANATION OF THE REFERENCE NUMERALS eNB Radio base station
UE Mobile station
11, 21 Handover processing unit

The invention claimed is:

1. A mobile communication method, comprising the steps of:
   causing, in a state where a first radio base station establishes a first bearer with a mobile station by using an extended sequence number as a sequence number in a PDCP layer, the first radio base station to determine to perform handover processing of the mobile station to a second radio base station not supporting the extended sequence number; and
   causing the second radio base station to create a handover instruction signal which instructs deletion of a setting including a bearer and addition of a second bearer between the mobile station and the second radio base station by executing a Full configuration function, and to transmit the handover instruction signal to the first radio base station.

* * * * *